United States Patent [19]

Landsman et al.

[11] Patent Number: 5,217,821
[45] Date of Patent: Jun. 8, 1993

[54] HIGH CURRENT ACID FUEL CELL ELECTRODES

[75] Inventors: Douglas A. Landsman, Hartford, Conn.; Paul A. Plasse, Blandford, Mass.

[73] Assignee: International Fuel Cells Corporation, S. Windsor, Conn.

[21] Appl. No.: 830,551

[22] Filed: Feb. 3, 1992

Related U.S. Application Data

[63] Continuation of Ser. No. 542,579, Jun. 25, 1990, abandoned.

[51] Int. Cl.$^5$ .............................................. H01M 4/86
[52] U.S. Cl. ........................................ 429/13; 424/42
[58] Field of Search ................................. 429/13, 42

[56] References Cited

U.S. PATENT DOCUMENTS

| | | | |
|---|---|---|---|
| 4,362,290 | 12/1982 | Blanchart et al. | 429/42 |
| 4,407,906 | 10/1983 | Stonewart | 429/42 |
| 4,847,173 | 7/1989 | Mitsunaga et al. | 429/42 X |
| 4,931,168 | 6/1990 | Watanabe et al. | 204/284 |
| 4,970,128 | 11/1990 | Itoh et al. | 429/42 |

Primary Examiner—Stephen Kalafut
Attorney, Agent, or Firm—Peter R. Ruzek

[57] ABSTRACT

Electrodes for an acid fuel cell are disclosed. The electrodes include a porous substrate and a catalyst layer supported on the substrate. The catalyst layer includes catalyst particles, a hydrophobic binder for providing a network of hydrophobic gas passages communicating with the catalyst particles and hydrophilic catalytically inactive particles for providing a network of liquid transport passages throughout the catalyst layer. The electrodes provide improved resistance to flooding and pumping and may be operated at high current density without developing severe concentration polarization.

15 Claims, 1 Drawing Sheet

HIGH CURRENT ACID FUEL CELL ELECTRODES

This application is a continuation of Ser. No. 542,579, now abandoned, filed Jun. 25, 1990.

TECHNICAL FIELD

The present invention pertains to fuel cell electrodes and particularly to electrodes for fuel cells having an acid electrolyte.

BACKGROUND OF THE INVENTION

A fuel cell is a device for converting chemical energy into electricity. An acid fuel cell comprises an anode, a cathode and an acid electrolyte held within a porous nonconducting matrix between the anode and the cathode. The anode and cathode each comprise a porous substrate and a porous catalyst layer supported on the porous substrate. Phosphoric acid is typically used as the acid electrolyte because it is nonvolatile and stable in both hydrogen and oxygen at the operating temperatures of an acid fuel cell.

Conventional acid fuel cells operate at temperatures in the range of 150o C to 250o C at pressures between 1 and 8 atmospheres. A hydrogen containing gas is fed to the anode of the cell and an oxygen containing gas is fed to the cathode of the cell. At the anode the hydrogen is electrochemically oxidized and gives up electrons according the reaction:

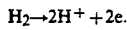
$H_2 \rightarrow 2H^+ + 2e$.

When the anode and cathode are connected through an external circuit the electrons so produced travel from the anode to the cathode, where they react electrochemically according to the reaction:

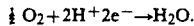
$\frac{1}{2} O_2 + 2H^+ + 2e^- \rightarrow H_2O$.

A flow of hydrogen ions through the acid electrolyte completes the electrical circuit.

Conventional gas diffusion electrodes used in acid fuel cells consist of a catalyst layer supported on a porous, conductive substrate. The catalyst layer typically consists of a mixture of supported catalyst particles, e.g. a finely divided noble metal dispersed over a porous conductive support and a porous hydrophobic binder, e.g. sintered submicron size particles of polytetrafluoroethylene.

The electrochemical reactions occur at the surfaces of the supported catalyst particles. The support material forms a network of electrolyte filled channels and the porous hydrophobic binder provides an interpenetrating network of hydrophobic channels for gas transport. The reactant gases gain access to the catalytic surfaces and gaseous products escape from the catalyst layer through the network of hydrophobic channels.

The performance of an acid fuel cell is limited at high current densities by phenomena termed "flooding" and "pumping".

"Flooding" refers to the penetration of electrolyte into hydrophobic regions of the catalyst layer which should contain only gas. This misplaced liquid hinders and may totally obstruct the supply of reactant gas to local regions of the catalyst. As a result there is an increase in electrode polarization as the non-flooded regions of the electrode are forced to carry more current. The process is self-propagating and will eventually lead to cell failure. In fuel cells having an acid electrolyte the flooding phenomenon is most prevalent at the cathode i.e., at the water-producing electrode.

The term "pumping" refers to the bulk movement of electrolyte from one side of the cell to the other. For example, in the case of fuel cells with phosphoric acid as the electrolyte it results from the electromigration of the non-electroactive phosphate anions towards the anode. At high current densities sufficient pressure can be built up in the anode to force electrolyte out of the back of the electrode. Accumulation of electrolyte on the gas side of the electrode restricts the supply of reactant and can lead to severe concentration polarization.

The conventional approach to the problems of electrolyte intrusion into gas electrodes has been to make the catalyst layers of the electrodes more hydrophobic. The catalyst layer may be made more hydrophobic by increasing the relative amount of hydrophobic polymer in the layer or by increasing the temperature or the process time during the sintering of the electrode. These strategies have achieved only limited success.

What is needed in the art is a way to reduce the flooding and pumping phenomena to provide fuel cell electrodes that may be operated continuously at high current density.

SUMMARY OF THE INVENTION

A gas diffusion electrode for conducting an electrochemical reaction in an acid fuel cell is disclosed. The electrode includes a porous substrate and a catalyst layer disposed on the substrate. The catalyst layer includes a catalytically effective amount of catalyst particles for promoting the electrochemical reaction, a porous hydrophobic binder for providing a network of hydrophobic gas pathways communicating with the catalyst particles and hydrophilic catalytically inactive particles in an amount effective to provide a network of liquid transport pathways throughout the catalyst layer. The electrodes of the present invention provide improved liquid transport and are resistant to flooding and electrolyte pumping.

A fuel cell and a method for generating electricity using gas diffusion electrodes according to the present invention are also disclosed.

DETAILED DESCRIPTION OF THE INVENTION

Figure 1:
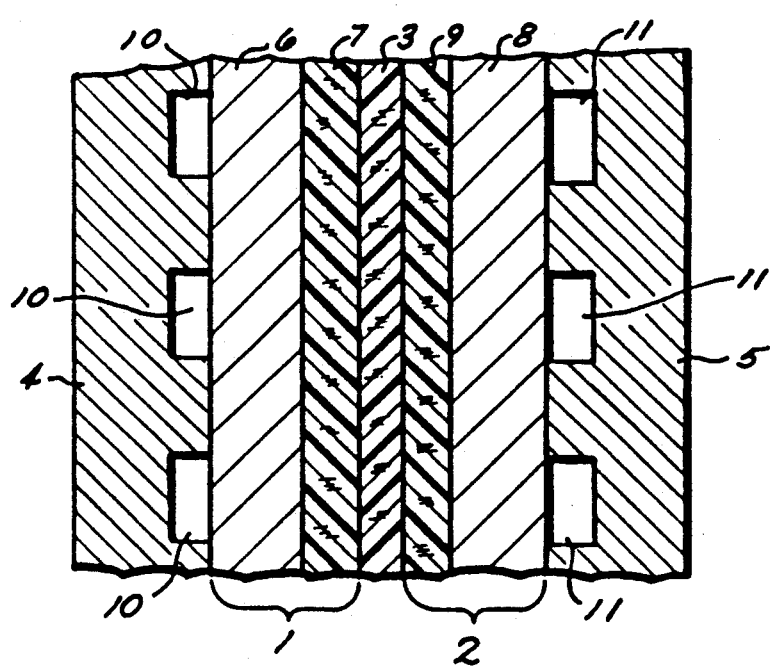
FIG. 1 shows a schematic cross section of an acid fuel cell.

Referring to FIG. 1, the fuel cell includes an anode 1, a cathode 2, an electrolyte matrix 3 between the anode 1 and the cathode 2, an anode current collector 4 and a cathode current collector 5. The current collectors 4 and 5 may be porous and provide reservoirs for electrolyte expansion and/or storage. The anode 1 comprises a substrate 6 and an anode catalyst layer 7. The cathode 2 comprises a substrate 8 and a cathode catalyst layer 9. The catalyst layers 7 and 9 are oriented toward the matrix 3. Each of the elements of the cells contain some electrolyte with the distribution of the electrolyte being determined by the relative pore sizes of the individual elements. The matrix 3 has the finest pores and is always full of electrolyte. The anode 1 and the cathode 2 are electrically connected by an external circuit (not shown). Gas flow passages 10 and 11 direct reactant gases to the electrodes.

The porous substrate of an electrode of the present invention may be any porous substrate conventionally used in acid fuel cell electrodes. For example, the porous substrate may comprise a paper or fabric composed of carbon or graphite fibers. Preferably, the porous substrate of the electrodes of the present invention comprises graphitized carbon paper.

The hydrophobic binder of the catalyst layer of an electrode of the present invention may be any hydrophobic polymer conventionally used for making acid fuel cell electrodes. Preferably, the hydrophobic binder of the electrode of the present invention comprises a fluoropolymer. Most preferably, the hydrophobic binder comprises polytetrafluoroethylene. The catalyst layer of the present invention may comprise between about 20 weight percent and about 60 weight percent of the hydrophobic polymer.

The catalyst layer of the anode of the present invention includes catalyst particles that promote the electrochemical oxidation of hydrogen in an acid electrolyte. The catalyst particles of the catalyst layer of the anode of the present invention may be any catalyst particles conventionally used as an anode catalyst in an acid fuel cell electrode. Typically, such catalyst particles comprise a metal dispersed on a chemically inert support and the term "catalyst particles" as used herein means the combination of metal crystallites on a support. Metals suitable for use as the metal of the anode may, for example, comprise a platinum group metal, i.e. platinum, palladium, ruthenium, osmium, rhodium or iridium, as well as combinations and alloys thereof. In a Preferred embodiment, the catalyst particles of the anode catalyst layer of the electrode of the present invention comprise finely divided platinum dispersed on the surface of a conductive particulate carbon black support, e.g. Vulcan XC-72 (Cabot Corporation). The anode catalyst particles of the preferred embodiment provide an initial platinum surface area of 100 $m^2/g$ and include between 10 weight percent and 20 weight percent platinum and between 80 weight percent and 90 weight percent carbon support.

The catalyst layer of an electrode of the present invention includes hydrophilic particles in an amount effective to provide a network of liquid transport pathways throughout the catalyst layer.

The hydrophilic particles of the anode of the present invention may be any particles that have hydrophilic, i.e. wettable by water, surfaces and that are stable under the operating conditions of the anode. Suitable hydrophilic particles include, e.g. carbon particles, graphitized carbon particles, silicon carbide particles and tungsten carbide particles. Preferably, the hydrophilic particles of the anode catalyst layer comprise graphitized carbon particles.

The ratio of weight of hydrophilic particles/weight of catalytic particles may range from about 0.2 to about 1.0. In a preferred embodiment, the composition of the anode catalyst layer, considered as a whole, is about 40 weight percent hydrophobic polymer, about 40 weight percent catalyst particles and about 20 weight percent hydrophilic particles.

The catalyst layer of the cathode of the present invention includes catalyst particles that are catalytically active in electrochemically reducing oxygen in an acid electrolyte. The catalyst particles of the cathode catalyst layer may be any catalyst particles conventionally used as a cathode catalyst in an acid fuel cell. Typically, cathode catalyst particles comprise a metal dispersed on a chemically inert support. Metals suitable for use as the metal of the catalyst particles of the cathode may, e.g., comprise a platinum group metal as well as combinations and alloys thereof. In a preferred embodiment, the catalyst particles of the cathode catalyst layer comprise finely divided platinum alloy dispersed on the surfaces of particles of graphitized carbon black. The cathode catalyst particles of the preferred embodiment provide an initial platinum alloy surface area between about 40 $m^2/g$ and 80 $m^2/g$ and include between about 10 weight Percent and 20 weight percent platinum alloy and between 80 weight percent and 90 weight percent carbon support.

The hydrophilic particles of the cathode catalyst layer may be any particles that have hydrophilic surfaces and that are stable under the operating conditions of the cathode. Suitable hydrophilic particles include, e.g. carbon black, graphitized carbon black and silicon carbide. Preferably, the hydrophilic particles of the cathode catalyst layer comprise graphitized carbon particles. The ratio of weight of hydrophobic particles/weight of catalyst particles may range between about 0.015 to about 2.5.

In a preferred embodiment, the composition of the cathode catalyst layer, considered as a whole, is about 40.5 weight percent polytetrafluoroethylene, about 49.5 weight percent catalyst particles and about 10 weight percent hydrophilic particles.

Figure 2:
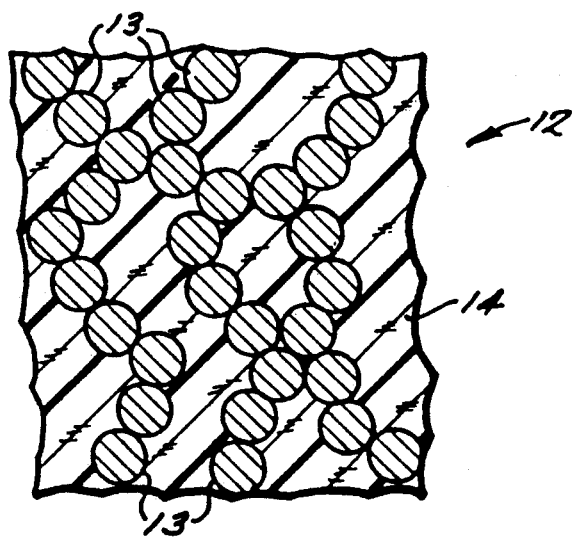
FIG. 2 shows a schematic diagram of a portion of a catalyst layer of a conventional electrode.

A schematic diagram of a portion of a catalyst layer 12 of a conventional electrode is shown in FIG. 2. The layer 12 includes catalyst particles 13 associated with a porous hydrophobic binder 14.

Figure 3:
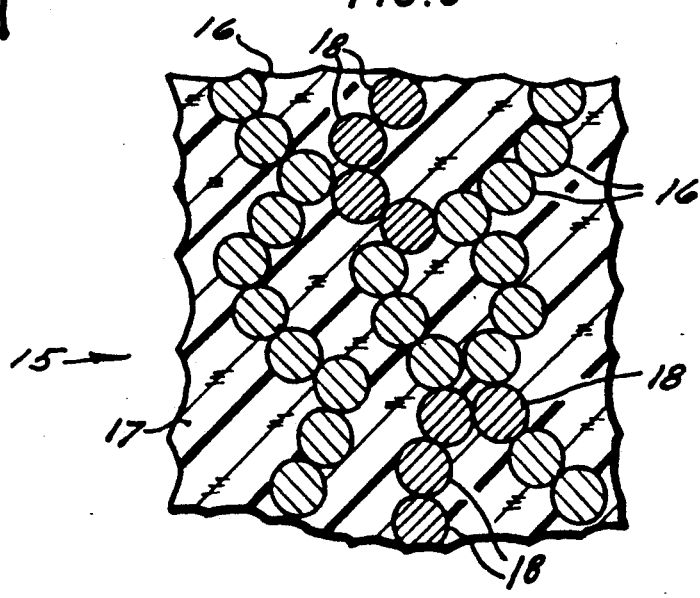
FIG. 3 shows a schematic diagram of a portion of a catalyst layer of an electrode of the present invention.

A schematic diagram of a portion of a catalyst layer 15 of an electrode of the present invention is shown in FIG. 3. The layer 15 includes catalyst particles 16 associated with a porous hydrophobic binder 17 which provides a network of hydrophobic gas pathways communicating with the catalyst particles 16. Hydrophilic particles 18 are distributed throughout the layer 15 to provide an interpenetrating network of catalytically inactive liquid transport pathways throughout the catalyst layer 15.

As is the case in conventional electrodes, the surfaces of the catalyst particles of the electrode of the present invention are associated with the hydrophobic polymeric binder to control the wettability of the surfaces, i.e. to provide hydrophobic pathways to the surfaces for gas transport. Typically, this is accomplished by flocculating an aqueous dispersion of hydrophobic polymer and catalyst particles.

In contrast, the hydrophilic particles of the present invention are incorporated into the catalyst layer in a manner which maintains the wettability of the surfaces of the hydrophilic particles. One method of incorporating hydrophilic particles into a catalyst layer while maintaining the wettability of the surfaces of the hydrophobic particles is described below.

Electrodes of the present invention may be made by dispersing the catalytic Particles and the hydrophobic polymer in water and flocculating the dispersion. The hydrophilic particles are then added to the catalyst particle/hydrophobic polymer floc with agitation. The mixture is filtered and transfer pressed onto a suitable porous substrate. The catalyst layer and substrate are dried and sintered to form the electrode. A small amount of hydrophobic polymer i.e. binder may be added with the hydrophilic particles, i.e. an amount effective to bind the hydrophilic particles within the layer without rendering them hydrophobic, e.g. from about 10 weight percent to about 20 weight percent based on the combined weight of hydrophilic particles and hydrophobic polymer added.

The hydrophilic particles are relatively inactive in catalyzing the reaction under the operating conditions of the cell i.e. make no significant contribution to the current generated within the catalyst layer which includes the hydrophilic particles. The surfaces of the hydrophilic particles remain wettable and the particles form a network of liquid transport pathways throughout the catalyst layer so that, during operation of the cell, liquid flows along the pathways and substantially surrounds the hydrophilic particles. Since liquid surrounding the particles hinders transport of gaseous reactants to the surfaces of the particles, the hydrophilic particles are substantially inactive in the electrochemical reaction occurring at the electrode, even in embodiments of the present invention wherein the hydrophilic particles comprise a material that is catalytically active in the reaction occurring at an electrode that includes the hydrophilic particles.

The hydrophilic particles of the electrode of the present invention provide a network of wettable surfaces throughout the catalyst layer. Since the hydrophilic particles of the electrode are not active in promoting the electrochemical reaction occurring at the surfaces of the catalyst particles of the electrode, i.e. the hydrophilic particles make no substantial contribution to hydrogen ion generation at the anode or to water generation at the cathode, the network of wettable surfaces provided by the hydrophilic particles functions primarily as a passive network of liquid transport pathways.

EXAMPLE 1

An anode (A1) was fabricated according to the method of the present invention. A PTFE/catalyst dispersion (X) was formed. A carbon-supported platinum catalyst (0.170 g of 10% by weight Pt on Vulcan XC-72) was stirred into 30 ml distilled water and then dispersed ultrasonically. Into this dispersion of catalyst was stirred 2 ml of a diluted TFE-30 solution containing 0.170 g polytetrafluoroethylene solids and the resulting catalyst/PTFE mixture was blended ultrasonically. On standing a floc of catalyst and PTFE settled out of the dispersion leaving a clear supernatant liquid.

A PTFE/hydrophilic particle dispersion (Y) was formed. In a separate vessel 0.076 g of uncatalyzed support material (Vulcan XC-72) plus 0.1 ml of diluted TFE-30 were stirred into 30 ml distilled water and then dispersed ultrasonically.

Dispersion X was stirred for 15 seconds and then dispersion Y was added to dispersion X. The mixture (X+Y) was stirred for 10 seconds and immediately vacuum filtered on to filter paper using a (3"×3") square crock. The moist filter cake was press transferred to a graphite paper substrate, dried, rolled and sintered at 660° F. for 15 minutes.

An anode (A2) was fabricated as described above with the exceptions that the dispersion of hydrophilic particles contained 0.085 g Vulcan XC-72 and had no PTFE binder.

A conventional anode (A3) was fabricated by a process analogous to that described above except that steps involved in adding the hydrophilic particles were omitted.

The catalyst layers of the anodes in Example 1 each contained 0.25 mg Pt/cm$^2$: the compositions of the catalyst layers are summarized in Table 1.

TABLE 1

Composition of Anode Catalyst Layers (By Weight Percent)

| | ANODE | | |
|---|---|---|---|
| | A1 | A2 | A3 |
| Catalyst | 40 | 40 | 50 |
| PTFE (associated w/ the catalyst) | 40 | 40 | 50 |
| Wettable Component | 18 | 20 | — |
| PTFE (associated w/ the wettable component) | 2 | — | — |

EXAMPLE 2

A cathode (C1) was fabricated according to the method of the present invention. A PTFE/catalyst dispersion (S) was formed. A graphite-supported platinum alloy catalyst (0.275 g of 11.3 weight percent platinum relative to the graphitized support) was stirred into 30ml distilled water and the dispersed ultrasonically. Diluted aluminum nitrate solution was added and the pH of the dispersion was adjusted by means of dilute hydrochloric acid or dilute ammonium hydroxide solutions. Hydrophobic polymer (2.70 ml of a diluted TFE-30 solution—containing a total of 0.225 g PTFE solids) was added and the catalyst/PTFE mixture was blended ultrasonically. On standing, this dispersion separated into a floc and a clear supernatant liquid.

A PTFE/hydrophilic particle dispersion (T) was formed. In a separate vessel 0.193 g graphitized Vulcan XC-72 and 0.25 ml of diluted TFE-30 solution were dispersed ultrasonically in 30 ml distilled water.

Dispersion S was stirred and dispersion T was added to it. The mixture (S+T) was stirred for 10 seconds and immediately poured into a 3"×3" filter crock and vacuum filtered. The moist filter cake was press transferred to a graphite paper substrate, dried, rolled and sintered at 660° for 15 minutes.

A cathode (C2) was fabricated as described above with the exceptions that the dispersion of hydrophilic particles contained 0.056 g graphitized Vulcan XC-72 and had no PTFE binder.

A conventional cathode (C3) was fabricated by a process analogous to that described above with the exception that steps involving the addition of the hydrophilic particles were omitted.

The catalyst layers of the cathodes in Example 2 all contained 0.5mg Pt/cm$^2$. The compositions of the catalyst layers are summarized in Table 2.

TABLE 2

Composition of Cathode Catalyst Layers (By Weight Percent)

| | CATHODE | | |
|---|---|---|---|
| | C1 | C2 | C3 |
| Catalyst | 38.5 | 49.5 | 55.0 |
| PTFE (associated w/ the catalyst) | 31.5 | 40.5 | 45.0 |
| Wettable Component | 27.0 | 10.0 | — |
| PTFE (associated w/ the wettable component) | 3.0 | — | — |

EXAMPLE 3

Cell 4329 (biphase electrodes, A1 and C1) and cell 4330 (conventional electrodes, A3 and C3) were assembled and operated at atmospheric pressure and 415° F. The fuel was (70% $H_2$, 29% $CO_2$ and 1% CO) and the oxidant was air. The flow rates of fuel and oxidant were such that 80% of the hydrogen and 60% of the oxygen fed to the cells were consumed. Cell performances as a function of current density, after 300 hours of operation, are shown in Table 3.

TABLE 3

| | Cell Voltage as a Function of Current Density | | | |
|---|---|---|---|---|
| | AT AMP/FT | | | |
| CELL #/VOLTS | 200 | 300 | 500 | 600 |
| 4329 (biphase electrodes) | 0.664 | 0.610 | 0.565 | 0.525 |
| 4330 (conventional electrodes) | 0.648 | 0.592 | 0.523 | * |

\* = unstable

The cell 4329, with electrodes of the present invention, not only gave better performance, but was able to operate at higher current densities than the cell 4330 with conventional electrodes. Tests showed that the main reason for the differences in voltage was polarization of the anode—i.e. the conventional anode in cell 4330 showed clear symptoms of anode flooding particularly at the higher current densities.

EXAMPLE 4

Cell 4362 (biphase electrodes, A2 and C2) and cell 4383 (conventional electrodes, A3 and C3) were assembled and operated at 300 Amp/ft$^2$/415° F./14.7 psia on the same reactant gases and at the same reactant utilizations as described in Example 3.

After completing 250 hours of operation, both cells were subjected to operations which typically cause an increase in cathode polarization due to flooding. The chief indicator of flooding is the oxygen gain, i.e., the increase in cell voltage when oxygen is substituted for air as the cathode reactant. Flooded electrodes, suffering from diffusion problems, show a larger improvement in performance when operated on oxygen rather than air, i.e., they show higher gains. Table 4 shows cathode gains for cells 4362 and 4383 following (i) three shutdown/restart cycles, (ii) a wet-up i.e., a temporary expansion of the electrolyte volume caused by generating water faster than it is being removed, and (iii) and addition of electrolyte which increased the volume of electrolyte within the cells by about 30%.

TABLE 4

| Effect of Operating Conditions on Oxygen Gains | | | |
|---|---|---|---|
| CELL # | Operating Conditions | Oxygen Gain (MV at 300 ASF) Pre/Post | Δ(MV) |
| 4362 (biphase electrodes) | 3 shutdowns/ restarts | 96/98 | 2 |
| | 1 wet-up | 101/105 | 4 |
| | 1 acid addition | 105/102 | −3 |
| 4383 (conventional electrodes) | 3 shutdowns/ restarts | 100/110 | 10 |
| | 1 wet-up | 110/119 | 9 |
| | 1 acid addition | 119/131 | 12 |

The results in Table 4 show that the biphase cathodes of present invention are clearly superior to conventional cathodes in regard to resistance to flooding.

The flooding and pumping phenomena arise from the limited rate at which a conventional fuel cell electrode is able to transport liquids. Flooding occurs when the rate at which water is generated in the cathode reaction at the cathode exceeds the rate at which the water can be transported away from the catalyst layer of the cathode. Pumping occurs when hydrogen ions are generated at a rate that is higher than that at which the hydrogen ions can be transported from the catalyst layer of the anode. The concentration gradient forces phosphate ions to migrate to the anode.

The hydrophilic particles of the electrodes of the present invention provide hydrophilic conduits for liquid transport through the electrodes. The hydrophilic particles are catalytically inactive with respect to the electrochemical reaction occurring at the electrode and therefore provide hydrophilic conduits which do not generate either ions or water. The provision of hydrophilic catalytically inactive pathways through the electrode catalyst layer directly addresses the cause of the flooding and pumping problems experienced with conventional electrodes and results in substantial improvements in electrode performance.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A gas diffusion electrode for conducting an electrochemical reaction in an acid fuel cell, consisting essentially of:
   a porous substrate capable of accommodating liquid electrolyte in its pores and having two major surfaces; and
   a catalyst layer dispersed on one of the major surfaces of the substrate, said catalyst layer comprising first and second interpenetrating fluid transport networks,
   said first network comprising a mixture of:
      a catalytically effective amount of catalyst particles, said catalyst particles being catalytically active in promoting the electrochemical reaction, and
      a porous hydrophobic polymeric binder for providing an interconnecting system of hydrophobic gas transport pathways that establish communication between the substrate pores and the catalyst particles, and
   said second network comprising:
      hydrophilic particles substantially inactive in promoting the electrochemical reaction and having surfaces wettable by water, said hydrophilic particles being incorporated into the catalyst layer in a manner which maintains wettability of the surfaces of the hydrophilic particles and in an amount effective to provide an interconnecting system of liquid transport pathways for enhancing transport of aqueous liquid throughout the catalyst layer and across the one major surface of the substrate between the liquid transport pathways and the substrate pores.

2. The electrode of claim 1, wherein the catalyst layer comprises:
   from about 25 weight percent to about 60 weight percent of the hydrophobic polymeric binder; and
   from about 40 weight percent to about 75 weight percent of the catalyst particles and hydrophilic particles combined, said catalyst particles and hydrophilic particles being included in a ratio by weight of hydrophilic particles to catalyst particles between about 0.015 and about 2.5.

3. The electrode of claim 1, wherein the electrode comprises a cathode, the electrochemical reaction comprises electrochemically reducing oxygen in an acid electrolyte and the cathode is resistant to flooding.

4. The electrode of claim 3, wherein the catalyst particles comprise an inert support; and
a metal chosen from the group consisting of platinum palladium, rhodium, osmium, ruthenium, iridium and combinations or alloys thereof dispersed on the support.

5. The electrode of claim 4, wherein the inert support comprises graphitized carbon particles and the metal comprises a platinum alloy.

6. The electrode of claim 3, wherein the hydrophilic particles are selected from the group consisting of carbon particles, graphitized carbon particles, silicon carbide particles and tungsten carbide particles.

7. The electrode of claim 3, wherein the catalyst layer comprises about 40 weight percent hydrophobic polymeric binder, about 40 weight percent catalyst particles and about 20 weight percent hydrophilic particles.

8. The electrode of claim 1, wherein the electrode comprises an anode, the electrochemical reaction comprises electrochemically oxidizing hydrogen in an acid electrolyte and the anode is resistant to electrolyte pumping.

9. The electrode of claim 8, wherein the catalyst particles comprise an inert support, and a metal chosen from the group consisting of platinum, palladium, osmium, ruthenium, rhodium, iridium and combinations or alloys thereof dispersed on the inert support.

10. The electrode of claim 9, wherein the inert support comprises graphitized carbon particles and the metal comprises platinum.

11. The electrode of claim 8, wherein the hydrophilic particles comprise carbon black, graphitized carbon black or silicon carbide particles.

12. The electrode of claim 8, wherein the catalyst layer comprises about 40.5 weight percent hydrophobic polymeric binder, about 49.5 weight percent catalyst particles and about 10 weight percent hydrophilic particles.

13. The electrode of claim 1, wherein the electrode is made by the process of:
preparing an aqueous dispersion of catalyst particles and hydrophobic polymer particles;
flocculating the dispersion to form a flocculent suspension:
mixing hydrophilic particles with the flocculent suspension to form a mixture;
filtering the mixture to form the catalyst layer;
disposing the catalyst layer on the substrate; and
sintering the catalyst layer to form the electrode.

14. An acid fuel cell, comprising:
an anode;
a cathode; and
an acid electrolyte filled matrix interposed between said anode and said cathode,
said anode consisting essentially of:
a porous anode substrate capable of accommodating the acid electrolyte in its pores and having two major surfaces one of which faces said matrix, and
an anode catalyst layer dispersed on said one major surface of the anode substrate facing said electrolyte filled matrix, said anode catalyst layer comprising first and second interpenetrating fluid transport networks,
said first network comprising a mixture of:
a catalytically effective amount of anode catalyst particles, said anode catalyst particles being catalytically active in promoting electrochemical oxidation of hydrogen in the acid electrolyte, and
a porous hydrophobic polymeric binder for providing an interconnecting system of hydrophobic anode gas transport pathways that establish communication between the anode substrate pores and the anode catalyst particles, and
said second network comprising:
anode hydrophilic particles substantially inactive in promoting the electrochemical oxidation of hydrogen in the acid electrolyte and having surfaces wettable by water, said anode hydrophilic particles being incorporated into the anode catalyst layer in a manner which maintains the wettability of the surfaces of the anode hydrophilic particles an in an amount effective to provide an interconnecting system of anode liquid transport pathways for enhancing transport of aqueous liquid throughout the anode catalyst layer ad across the one major surface of the anode substrate between the anode liquid transport pathways and the anode substrate pores, and said cathode consisting essentially of:
a porous cathode substrate capable of accommodating the acid electrolyte in its pores and having two major surfaces one of which faces said matrix, and
a cathode catalyst layer dispersed on said one major surface of the cathode substrate facing said electrolyte filled matrix, said cathode catalyst layer comprising third and fourth interpenetrating fluid transport networks,
said third network comprising a mixture of:
a catalytically effective amount of cathode catalyst particles, said cathode catalyst particles being catalytically active in electrochemically reducing oxygen in the acid electrolyte, and
a porous hydrophobic polymeric binder for providing an interconnecting system of hydrophobic cathode gas transport pathways that establish communication between the cathode substrate pores and the cathode catalyst particles, and
said fourth network comprising:
cathode hydrophilic particles substantially inactive in promoting the electrochemical reduction of oxygen in the acid electrolyte and having surfaces wettable by water, said cathode hydrophilic particles being incorporated into the cathode catalyst layer in a manner which maintains the wettability of the surfaces of the cathode hydrophilic particles and in an amount effective to provide an interconnecting system of cathode liquid transport pathways for enhancing transport of aqueous liquid throughout the cathode catalyst layer and across the one major surface of the cathode substrate between the cathode liquid transport pathways and the cathode substrate pores.

15. A method for generating electricity, comprising:

electrochemically oxidizing a fuel stream at an anode to generate a stream of electrons, said anode consisting essentially of:

a porous anode substrate;

an anode catalyst layer dispersed on a major surface of the substrate that faces an electrolyte filled matrix, said anode catalyst layer comprising:

a catalytically effective amount of first catalyst particles, said first catalyst particles being catalytically active in promoting the electrochemical oxidation of hydrogen in an acid electrolyte, a porous hydrophobic polymer binder for providing a network of hydrophobic gas pathways communicating with the first catalyst particles, and first hydrophilic particles in an amount effective to provide a network of liquid transport pathways throughout the anode catalyst layer, said first hydrophilic particles being substantially inactive in promoting the electrochemical oxidation of hydrogen in an acid electrolyte;

conducting the electrons to a cathode, said cathode consisting essentially of:

a porous cathode substrate;

a cathode catalyst layer dispersed on a major surface of the substrate that faces said electrolyte filled matrix, said cathode catalyst layer comprising:

a catalytically effective amount of second catalyst particles, said second catalyst particles being catalytically active in electrochemically reducing oxygen in an acid electrolyte, a porous hydrophobic polymer binder for providing a network of hydrophobic gas pathways communicating with the second catalyst particles, and second hydrophilic particles in an amount effective to provide liquid transport pathways throughout the cathode catalyst layer, said second hydrophilic particles being substantially inactive in promoting the electrochemical reduction of oxygen in an acid electrolyte; and electrochemically reducing oxygen at the cathode while simultaneously electrochemically oxidizing hydrogen at the anode.

* * * * *